J. CRESSMAN.
BELT SHIFTER.
APPLICATION FILED OCT. 20, 1908.
932,000.
Patented Aug. 24, 1909.
2 SHEETS—SHEET 2.
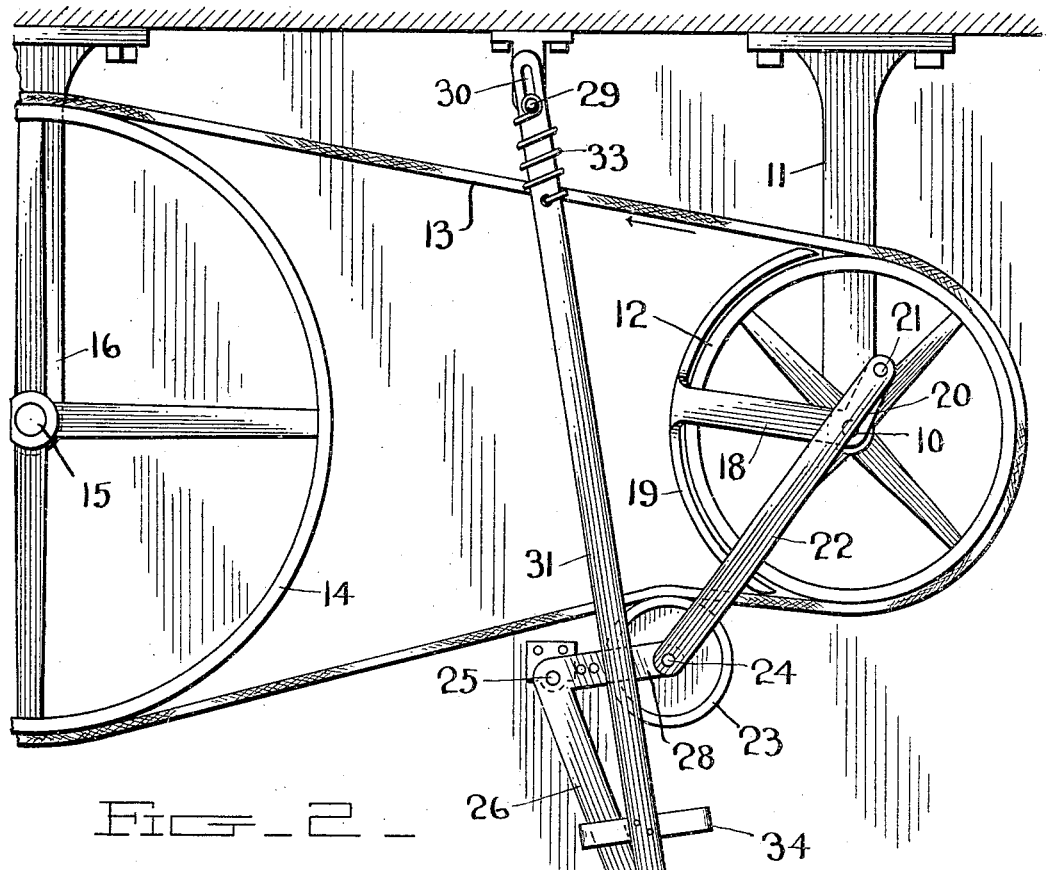
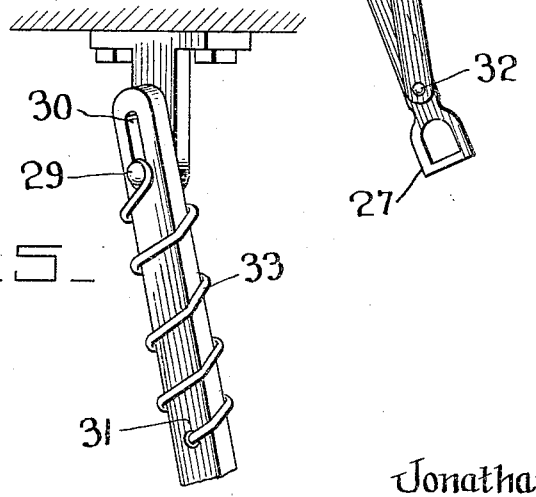
Witnesses
L. B. James
F. O. Parker
Inventor
Jonathan Cressman
By Chandler & Chandler
Attorneys

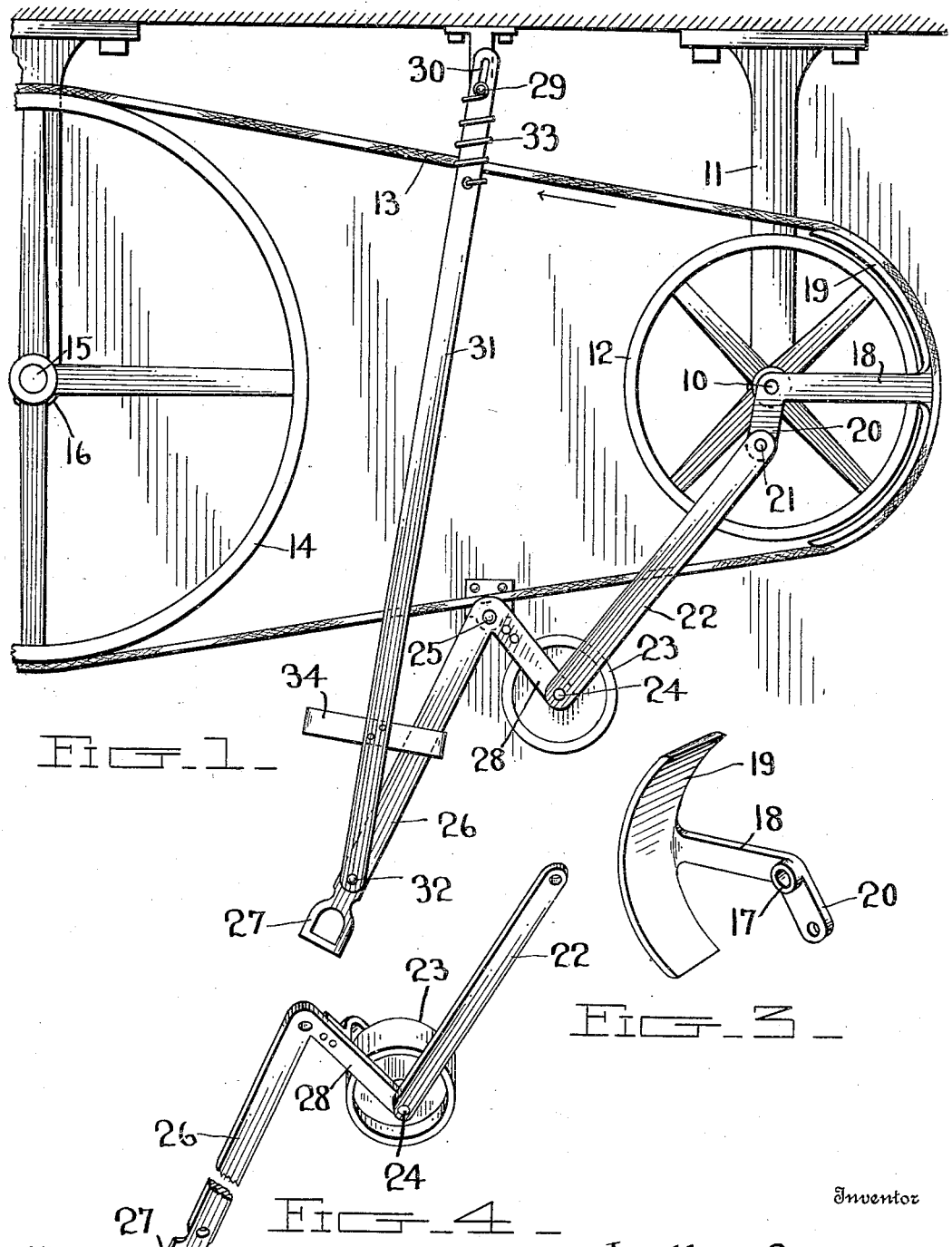

UNITED STATES PATENT OFFICE.

JONATHAN CRESSMAN, OF JANSEN, NEBRASKA.

BELT-SHIFTER.

932,000. Specification of Letters Patent. Patented Aug. 24, 1909.

Application filed October 20, 1908. Serial No. 458,663.

*To all whom it may concern:*

Be it known that I, JONATHAN CRESSMAN, a citizen of the United States, residing at Jansen, in the county of Jefferson, State of Nebraska, have invented certain new and useful Improvements in Belt-Shifters; and I do hereby declare the following to be a full, clear, and exact description of the invention, such as will enable others skilled in the art to which it appertains to make and use the same.

The invention relates to a belt shifter and more particularly to that class in which the belt is slackened on a driving pulley.

The primary object of the invention is the provision of a belt shifter having means for tensioning the belt while running and means coöperative therewith to initially start the belt in its movement and to protect the same from wear when shifted or slackened upon the pulley.

Another object of the invention is the provision of a belt shifter comprising means shiftable into and out of contact with a belt to tighten and slacken the same, and means simultaneously actuated thereby and adapted to move concentrically about the peripheral face of a driving pulley over which the belt is trained to hold the latter away from contact therewith when loose or slack thereon.

In the drawings accompanying and forming part of this specification is illustrated the preferred form of embodiment of the invention, which to enable those skilled in the art to practice the invention, will be set forth at length in the following description while the novelty of the invention will be brought out in the claim succeeding the description. However, minor changes, variations and modifications may be made such as come properly within the scope of the appended claim without departing from the spirit of the invention.

In the drawings, Figure 1 is a side elevation of pulleys and a belt trained thereover with the invention applied thereto, the said belt being held in a slack position. Fig. 2 is a similar view showing the belt in a tightened position. Fig. 3 is a detail perspective view of the shifting shoe. Fig. 4 is a detail perspective view of the manually operable shifting lever with the belt tightening roller mounted therein. Fig. 5 is a fragmentary detail view of the upper spring-controlled extremity of the reciprocating suspension rod.

Similar reference characters indicate corresponding parts throughout the several views in the drawings.

In the drawings the numeral 10 designates a driving shaft mounted in a suitable bearing 11 and having fixed to the same a driving pulley 12 over which is trained a driven belt 13, the latter also trained over a driven pulley 14 which is fixed to a journal or shaft 15 mounted in a suitable bearing 16 which bearings 11 and 16 are suspended from the ceiling or other suitable support.

Surrounding the driving shaft 10 at one side of the hub portion of the driving pulley 12 is a collar 17 the latter formed with an arm 18 carrying at its outer end a segment shaped shoe 19 the latter adapted to move in opposite directions concentrically about the peripheral face of the driving pulley 12 between the latter and the driven belt 13 trained over the same. Formed on the said collar 17 is a short shifter arm 20 the latter disposed at an angle with respect to the arm 18 supporting the shiftable shoe, and pivotally connected as at 21 to the said shifter arm 20 is a link 22 the same supporting a belt tightener such as a pulley or roller 23 journaled as at 24 on the opposite end of said link.

Mounted in a fixed bearing 25 is a manually operable shifter lever 26 terminating at one end in a hand grip or handle 27 and the opposite end is formed with a forked extremity forming spaced extensions 28 at an angle with respect to the shifter lever 26 and which extensions have their outer free extremities connected to the journal of the pulley or roller 23 forming the belt tightener so that upon moving the shifter lever 26 in one direction the said pulley or roller 23 will be moved into contact with the driven belt 13 to tighten the same upon the driving and driven pulleys respectively. Arranged in the same vertical plane of the bearing 25 and a considerable distance above the same is a pin or other member 29 freely engaging an elongated slot 30 formed in the upper end of a suspension oscillatory rod 31 the latter having its lower end connected by a pivot 32 to the shifter lever 26 adjacent the handle thereof. Connected to the pin 29 is one end of a coiled tension spring 33 the opposite end of which is connected to the rod 31 to maintain the same under tension however, permitting it to longitudinally shift upon actuating the shifter lever 26 in either direction. Formed on the rod 31 and extending in opposite directions transversely with respect to the same is a loop 34 to accommodate the movement of the shifter lever 26 and to limit the same when being manually operated in either direction so as to bring the belt tightener into and out of contact with the driven belts.

In operation and presuming that the shoe 19 is normally in a position to hold the driven belt 23 at rest by being interposed between the peripheral face of the driving pulley 12 and the said driven belt 13, now should it be desired to rotate the driven pulley the operator actuates the shifter lever 26 in a direction to raise the belt tightener or roller 23 into contact with the driven belt 13 and in doing so the link 22 will simultaneously actuate the shifter arm 20 to concentrically move the shoe 19 about the peripheral face of the driving pulley 12 and by the said driven belt 13 engaging the outer face of the shoe 19 an initial starting movement will be imparted to the driven belt upon the concentric movement of the shoe 19 and as the same continues to move from its normal position between the driving pulley 12 and the driven belt 13 the latter will contact or engage the peripheral face of the driving pulley so that rotary motion from the same will be imparted through the medium of the driven belt to the driven pulley.

When it is desired to slacken the driven belt 13 the operator now moves the shifter lever 26 in the opposite direction causing the belt tightener to leave the driven belt and at the same time the shoe 19 will be shifted to occupy its normal position between the peripheral face of the driving pulley 12 and the driven belt, so as to maintain the latter out of contact with the said driving pulley thereby bringing to rest both the latter and the driven pulley.

What is claimed is—

In a belt shifter of the class described, the combination with a driving pulley and a belt encircling the same, an L-shaped shifter lever disposed at one side of the driving pulley and pivotally mounted at the axis of rotation thereof, an arcuate shaped shoe concentrically movable about the periphery of the pulley between the latter and the belt and integral with one end of the shifter lever and at right angles thereto, a fixed depending bracket disposed a distance removed from the pulley and having a guide pin, a swinging pivotally mounted operating arm having an angularly disposed extension, a bracket fixed to said extension a roller journaled between said extension and bracket, a rigid connecting link pivotally connected to the shifter lever and said extension of the operable arm, a rod having one end containing an elongated slot slidably engaging the guide pin and having its opposite end pivotally connected near the free end of the operable arm, a yoke piece secured to the rod to limit the swinging movement of the operable arm, and a spring having one end fixed to the rod and its opposite end fixed to the guide pin.

In testimony whereof, I affix my signature, in presence of two witnesses.

JONATHAN CRESSMAN.

Witnesses:
  C. A. SHIESSEN,
  HENRY HEIDEEK.